Figure 3:
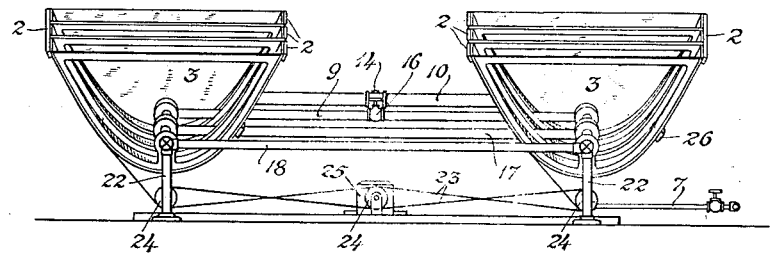

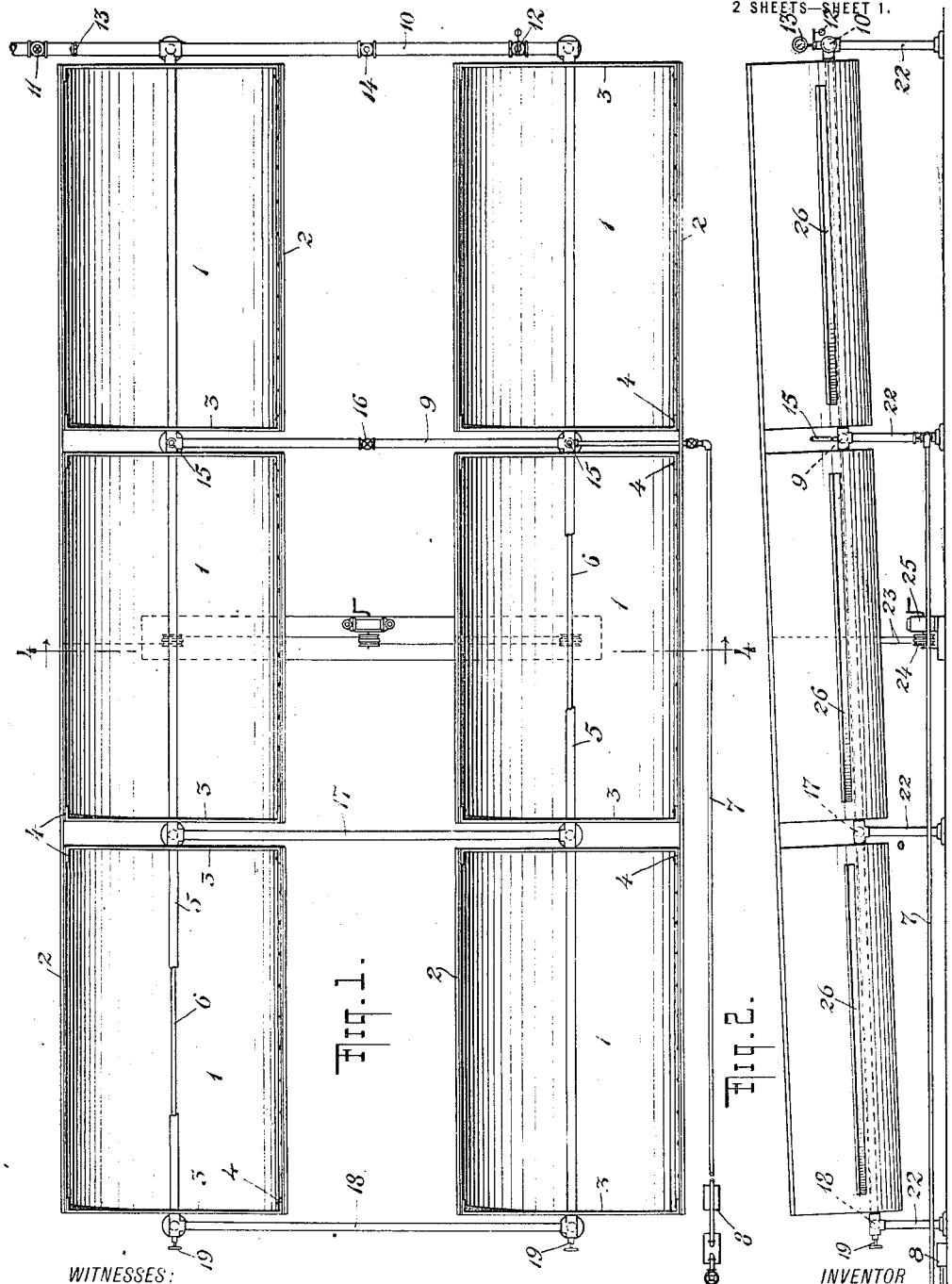

T. F. NICHOLS.
SOLAR BOILER.
APPLICATION FILED AUG. 7, 1913.

1,162,505.

Patented Nov. 30, 1915.
2 SHEETS—SHEET 2.

WITNESSES:
G. V. Rasmussen
M. H. Lockwood

INVENTOR
THOMAS F. NICHOLS
BY
Briesen Knauth
ATTORNEYS

UNITED STATES PATENT OFFICE.

THOMAS F. NICHOLS, OF PHOENIX, ARIZONA.

SOLAR BOILER.

1,162,505.

Specification of Letters Patent. Patented Nov. 30, 1915.

Application filed August 7, 1913. Serial No. 783,504.

*To all whom it may concern:*

Be it known that I, THOMAS F. NICHOLS, a citizen of the United States, residing at Phoenix, in the county of Maricopa and State of Arizona, have invented certain new and useful Improvements in Solar Boilers, of which the following is a specification.

The invention relates to an apparatus for utilizing the heat of the sun for power or other purposes by concentrating the heat rays therefrom upon suitably arranged and constructed pipes, boilers or conduits, in which water or other preferred fluid may usually be caused to flow.

The object of the invention is to provide an apparatus of the above character which is simple in construction and efficient in operation and which can be installed at reasonable cost.

A further object is to produce an apparatus which, being built in sections, may readily be constructed of any capacity desired and is adaptable to various uses.

In warm, arid regions where the sun shines a great deal, fuel is usually very scarce and for that reason it is desirable to use the sun's heat as an economical way of producing steam for power or other purposes. In case a large amount of power is required my apparatus may be used as a feed water heater in connection with an ordinary boiler using fuel. My apparatus may be used advantageously also for heating water for cooking and household purposes; and for individual house use a few sections may be readily installed in the yard or on the roof and, since it is substantially automatic in operation, will require little attention.

In the distillation of fluids of various characters my apparatus with its direct and return flow conduits, both receiving the heat of the sun concentrated thereon, will rapidly supply vapors in large quantities to any form of condenser that may be properly connected with the apparatus. My apparatus may also be used in connection with refrigeration and ice-making plants both for distilling the water for the ice and for generating steam for operating pumps, and compressors. In this use, my arrangement of auxiliary conduits and valves, connecting the several main conduits readily lends itself to subdivision so that part of the apparatus may be used for distilling the water and part for operating the pumps and compressors. In these and other uses my apparatus will be found useful and economical and may readily be modified to meet the requirements. I therefore do not wish to be limited to the particular form of the apparatus herewith shown and described, since, for convenience, only a few small groups of mirrors are shown, but it will readily be understood that the number of groups and the number and size of the mirrors in each group may be varied to meet the requirements of any particular installation.

Figure 4:
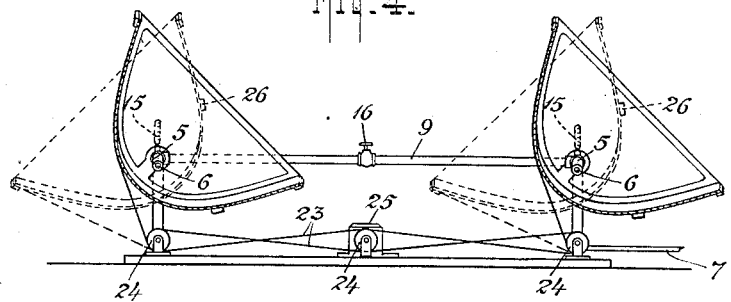
Figure 5:
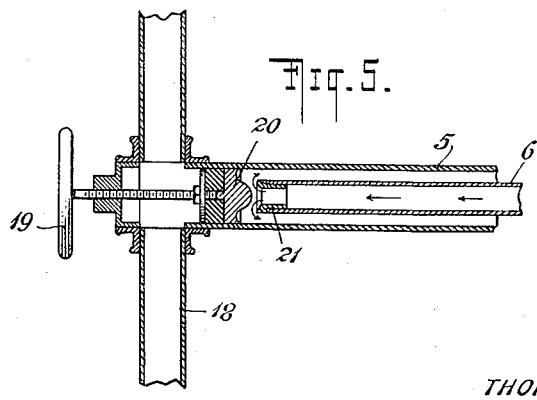

In the accompanying drawings which may be considered as illustrating the typical form of my apparatus, Figure 1 is a top plan view of the apparatus showing two groups of mirrors of three each. Fig. 2 is a side elevation. Fig. 3 is an end elevation looking from the lower end. Fig. 4 is a cross-section at 4—4 of Fig. 1. Fig. 5 shows details of conduit valve.

Referring to the drawings 1 represents a focusing mirror which preferably consists of a metallic plate bent in the form of a parabolic cylinder, the inner surface thereof being highly polished or otherwise adapted to serve as an efficient reflecting surface for the sun's rays. It will be understood that the mirrors may be made of any dimension to meet the requirements but preferably I construct them of convenient size for handling and then install a large number in groups or otherwise, so as to expose a large amount of surface to the sun. In the present instance I have shown the sheet metal reflector of each mirror as secured along the straight edges thereof to bars or angle irons 2, one of which may be continuous from end to end of each group of mirrors as shown, the object of such connection being to compel the mirrors to move in unison as more fully explained hereinafter. Each mirror is preferably fitted with ends 3 consisting of open metal frame except the most northerly end, in order not to throw shadows on the pipe provided with lugs or brackets 4 secured to the side bars 2. The ends 3 are preferably secured to the curved reflecting surface so as to assist in retaining the proper curvature thereof, and also, through the lugs 4, secured to the side bars 2, thus producing a slight rigid structure throughout.

Longitudinally of the mirror or group of mirrors at the focal axis thereof there extends a boiler or conduit which preferably comprises an outer tube 5 and an inner tube 6, here shown as concentric, but it will be understood that any suitable arrangement of tubes may be employed. The conduits 5 and 6 are located at the focal axis of the mirrors or in other words, the focal axis of each mirror of a group coincides with the center line or axis of the conduit for that group. The inner tubes or conduits 6 are suitably connected with a pipe 7 which may lead from a pump 8 or may be connected in any suitable manner with a supply of water or other fluid under pressure. Preferably the several conduits 6 take off from the pipe 7 as parallel branches but by a suitable arrangement of valves the direction of flow can be changed as desired. To facilitate this control of the flow in the pipes and conduits the several groups are cross connected by auxiliary conduits preferably as shown in the drawings. The auxiliary conduit 9, in the three mirror grouping shown, is connected with the conduits 5 between the second and third mirrors and the pipe 7 is preferably carried through this conduit to connect with the inner conduits 6 of the several groups. It will be seen that the ends of the conduits 5 above the auxiliary conduit 9 are not provided with inner conduits 6 thus leaving more room for expansion and space for the accumulation of steam or vapor. The upper ends of the conduits 5 are connected to another cross conduit 10, preferably of large diameter, which serves as the steam chamber and may be connected by suitable check valve 11 with the boiler, engine, pump, condenser or other apparatus it is desired to operate from the steam or vapor generated.

To properly control the steam generation of my apparatus the conduit 10 is preferably provided with a safety valve 12, a steam gage 13 and a suitable drip cock or blow off valve 14, which accessories may be of the usual or any preferred construction. The conduits 5 or one of the auxiliary conduits as 9 may be provided with a water gage 15 adapted to indicate the level of the water in the boiler. The auxiliary conduit 9 may also be provided with a regulating valve if desired, suitably located as at 16.

The lower ends of the conduits 5 are preferably cross connected by auxiliary pipes 17, 18, which may or may not be used as conduits as desired. The pipe 18, connecting the lower ends of the conduits 5, is preferably connected with the valves 19 which, as illustrated in Fig. 5, are adapted to control the direction of flow in the conduits 5 and 6. As shown in Fig. 5 the valve 19 is a piston valve adapted to close the end of the conduit 5 and permit the water in the boiler to flow down through the inner conduit 6 and return by the annular channel between the two conduits 5 and 6 as indicated by the arrows in Fig. 5. If desired the valve piston 20 may be moved in far enough to seat the conical portion thereof in a valve seat 21 formed in the end of the conduit 6 and thus close this conduit when it is desired to stop the flow or otherwise regulate the action of the boiler.

The apparatus is supported in an exposed position to receive the direct rays from the sun, and preferably at an angle to the horizontal as indicated in the drawings, the lower end being toward the south. The conduits and mirrors may be supported by brackets or framing of suitable character but preferably the conduits are secured to the upper ends of piping posts or brackets 22 properly proportioned to give the angle it is desired for the conduits and mirrors relative to the horizontal. In the form of apparatus shown the mirrors are preferably mounted to rotate about the conduits 5 as an axis, which, as previously pointed out, coincides with the focal axes of the mirrors. The open end frames 3 of the mirrors are shown as provided with arms extending upward and perforated with holes through which the conduits 5 pass and which serve as bearings when the mirrors are rotated.

It will be understood that in order to keep the mirrors facing the sun at all times they should be rotated about their axes at a uniform rate corresponding with the apparent movements of the sun. To obtain this uniform movement of the mirrors I preferably connect the mirrors together by suitable cords 23 and pulleys 24 which in turn are connected to a motor clock 25 in such manner that the mirrors will be moved automatically, the clock being regulated to correspond with the movement of the sun. To balance the action of the pulleys and maintain the mirrors facing upward, suitable means may be employed, such as the weights or bars 26, which are shown as secured along the sides of the mirrors in Figs. 2, 3 and 4.

The apparatus is adapted to be moved manually to face the sun at the beginning of the day, or whenever in need of adjustment, as indicated by the heavy lines in Fig. 4, after which the motor clock will cause them to follow the sun as indicated by the dotted lines in the same figure. In describing the apparatus the operation has been sufficiently indicated so as to be readily understood. In starting the apparatus it will be necessary to determine the direction of flow desired and adjust the conduit valves accordingly and then start the flow of water or fluid under pressure through the pipe 7, the mirrors having been turned by hand to face the sun, after which the apparatus will operate practically automatically.

I do not wish to be limited to the specific details of construction shown and described for it will be understood that various modifications may be made without departing from the spirit and scope of the claims.

I claim:

1. In a solar boiler the combination with a series of parabolic reflectors in axial alinement of concentrically arranged direct and return flow conduits located at the focal axis of said reflectors, said reflectors being adapted to rotate about said conduits, and a valve for opening or closing the connection between said direct and return flow conduits.

2. In a solar boiler the combination with a plurality of parallel rows of parabolic reflectors, the reflectors of each row being in axial alinement, of direct and return flow conduits located at the focal axis of each row of reflectors, a plurality of transversely arranged auxiliary conduits, valves for opening or closing the connection between said direct and return flow conduits of each row whereby the flow therethrough and through said auxiliary conduits is controlled.

3. In a solar boiler the combination with a plurality of parallel rows of parabolic reflectors, the reflectors of each row being in axial alinement, conduits passing through the focal axis of each row about which the reflectors are adapted to turn, means for turning the several rows of reflectors synchronously in one direction, counterbalancing means for turning them in the other direction and means for controlling the circulation in said conduits.

4. In a solar boiler the combination with a plurality of parallel rows of parabolic reflectors, the reflectors in each row being in axial alinement, concentrically arranged direct and return flow conduits at the focal axis of each row and about which said reflectors are adapted to rotate, auxiliary conduits interconnecting the conduits of the several rows, valves for controlling the flow through said conduits, counterbalancing means for influencing said reflectors to turn in one direction and means for synchronously turning said reflectors in the opposite direction whereby they are adapted to follow the sun.

In testimony whereof I have hereunto set my hand in the presence of two subscribing witnesses.

THOMAS F. NICHOLS.

Witnesses:
S. M. COTTEN,
J. W. DE SOUZA.